W. H. BROWNING.
APPARATUS FOR ADDING OR CALCULATING.
APPLICATION FILED NOV. 29, 1909.

1,010,227.

Patented Nov. 28, 1911.

13 SHEETS—SHEET 1.

WITNESSES.

INVENTOR
Walter H. Browning
BY
James L. Norris
Atty.

W. H. BROWNING.
APPARATUS FOR ADDING OR CALCULATING.
APPLICATION FILED NOV. 29, 1909.
1,010,227.
Patented Nov. 28, 1911.
13 SHEETS—SHEET 2.
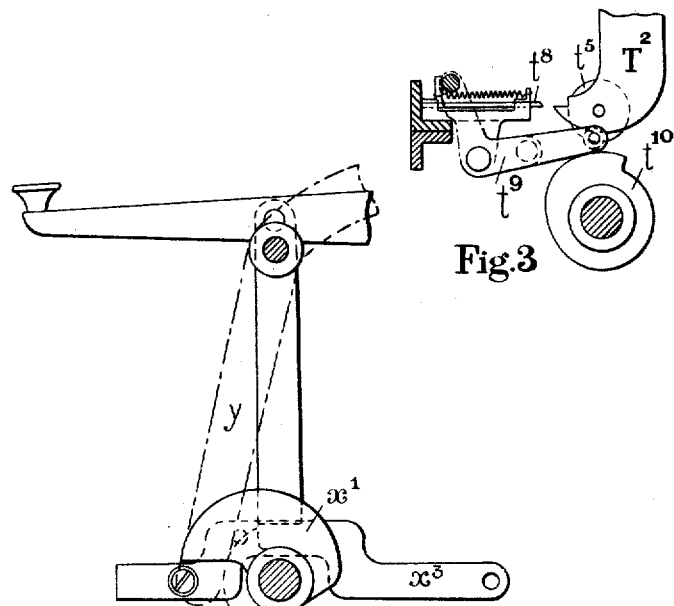
Fig. 3.
Fig. 2.
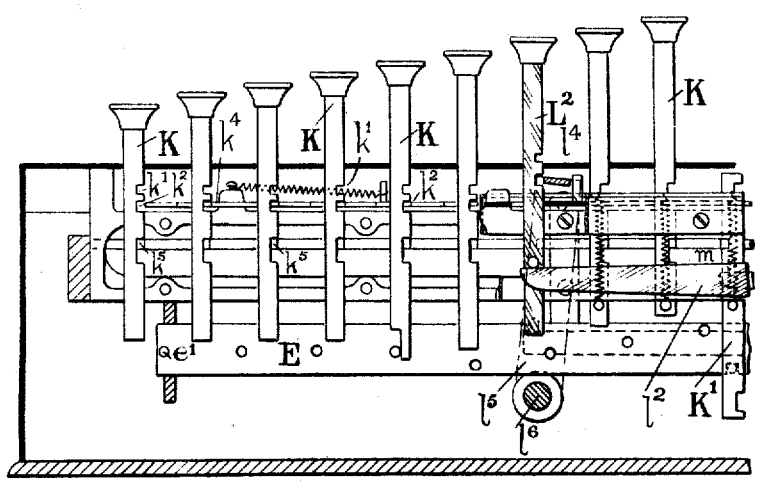
Fig. 1.ᵃ
WITNESSES.
INVENTOR.
Walter H. Browning
By James L. Norris
Atty

Figure 4:
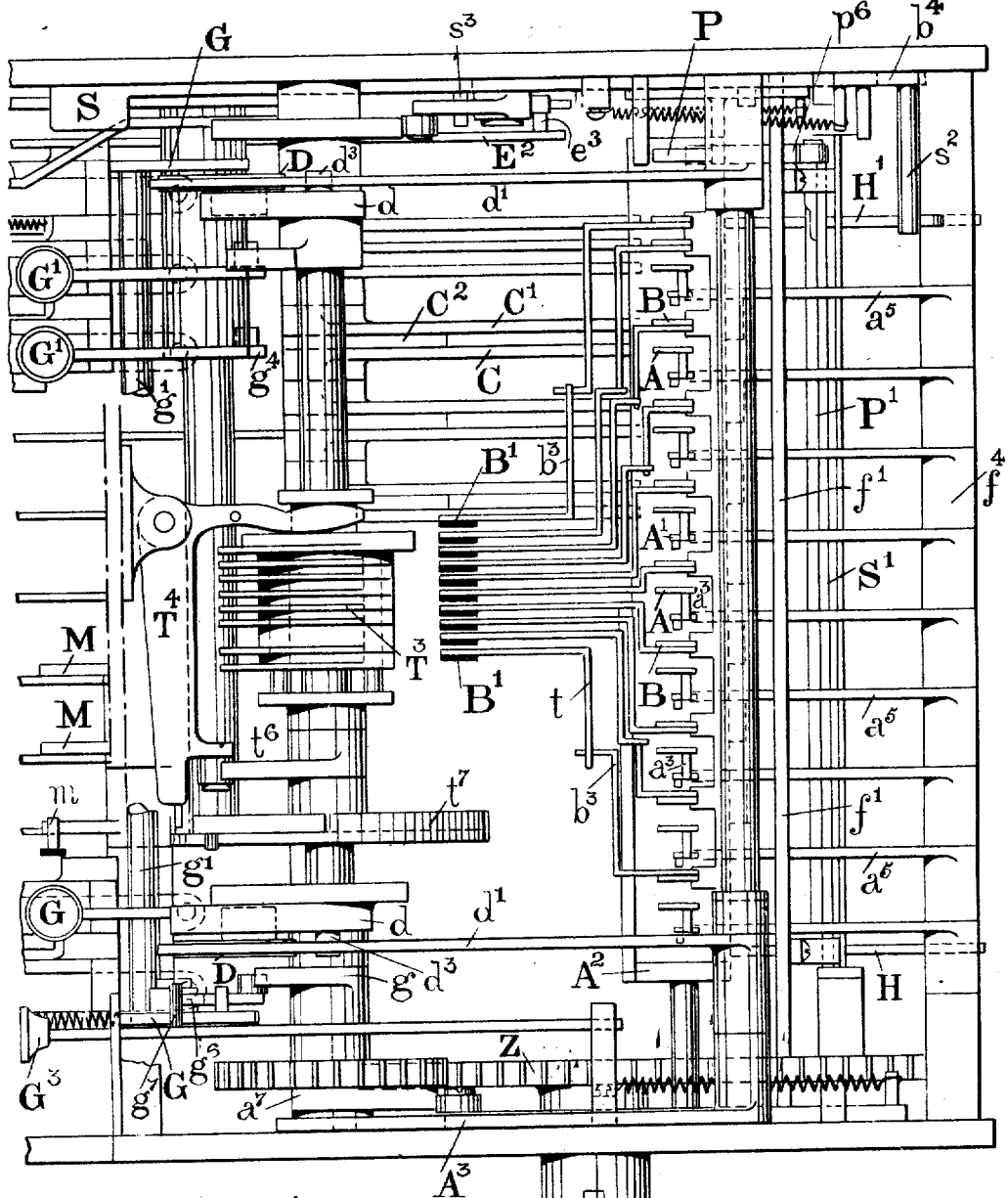

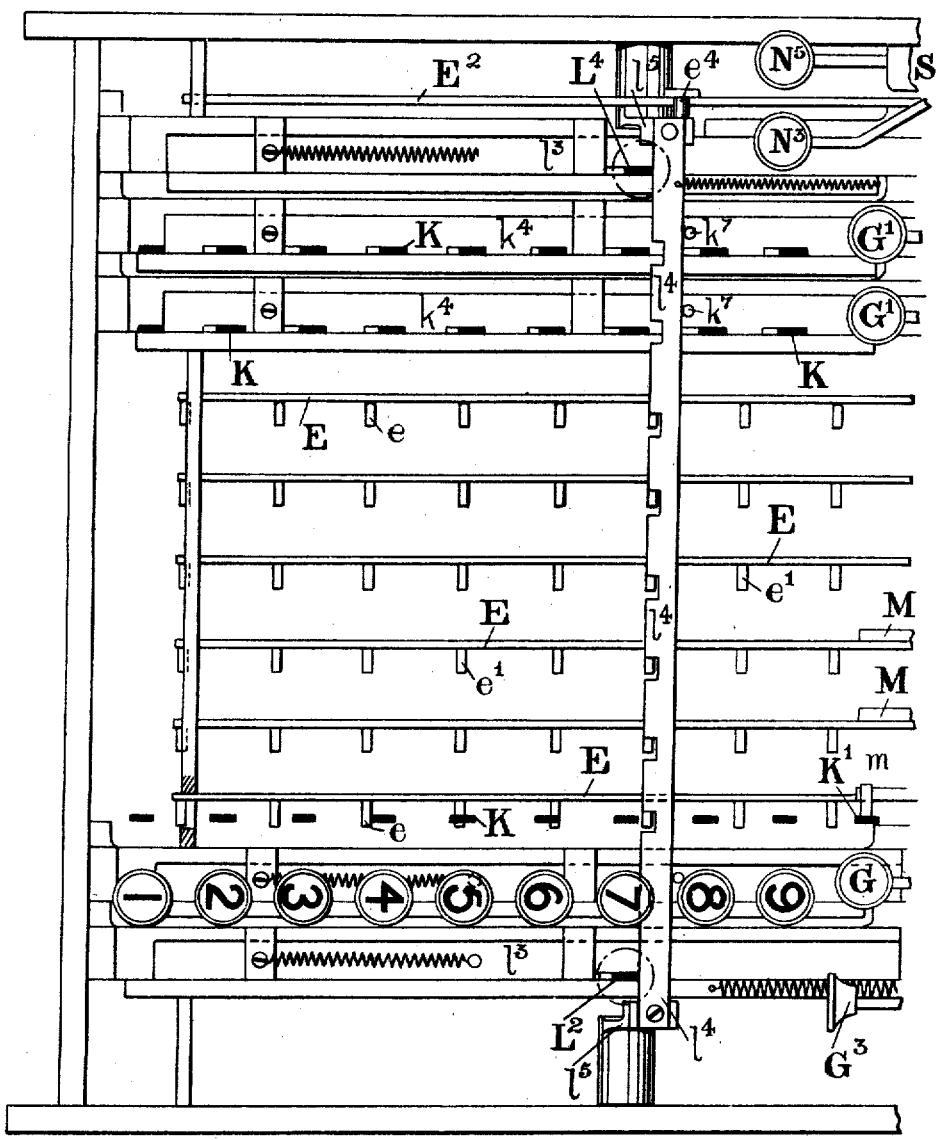
Fig. 4ᵃ

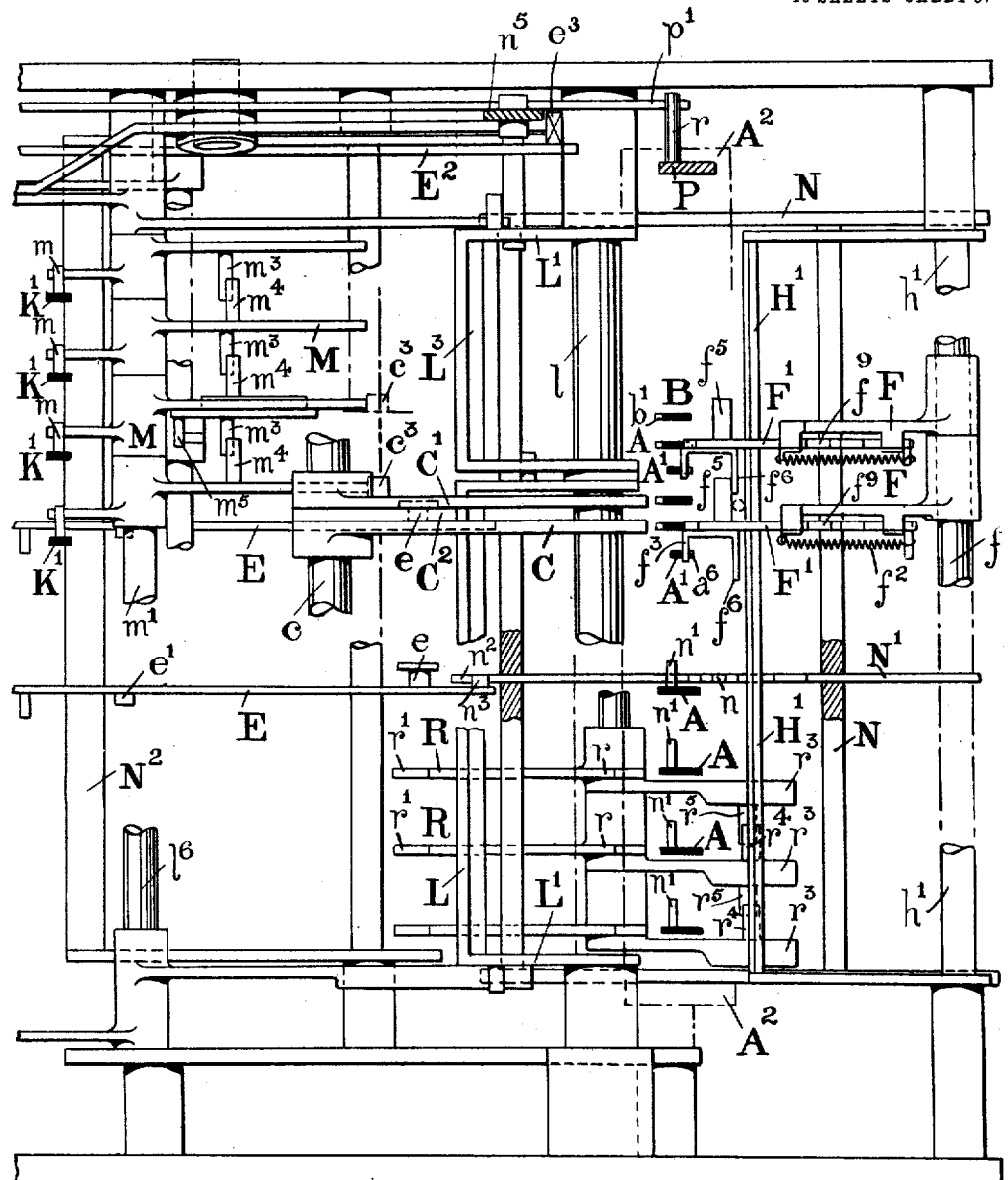

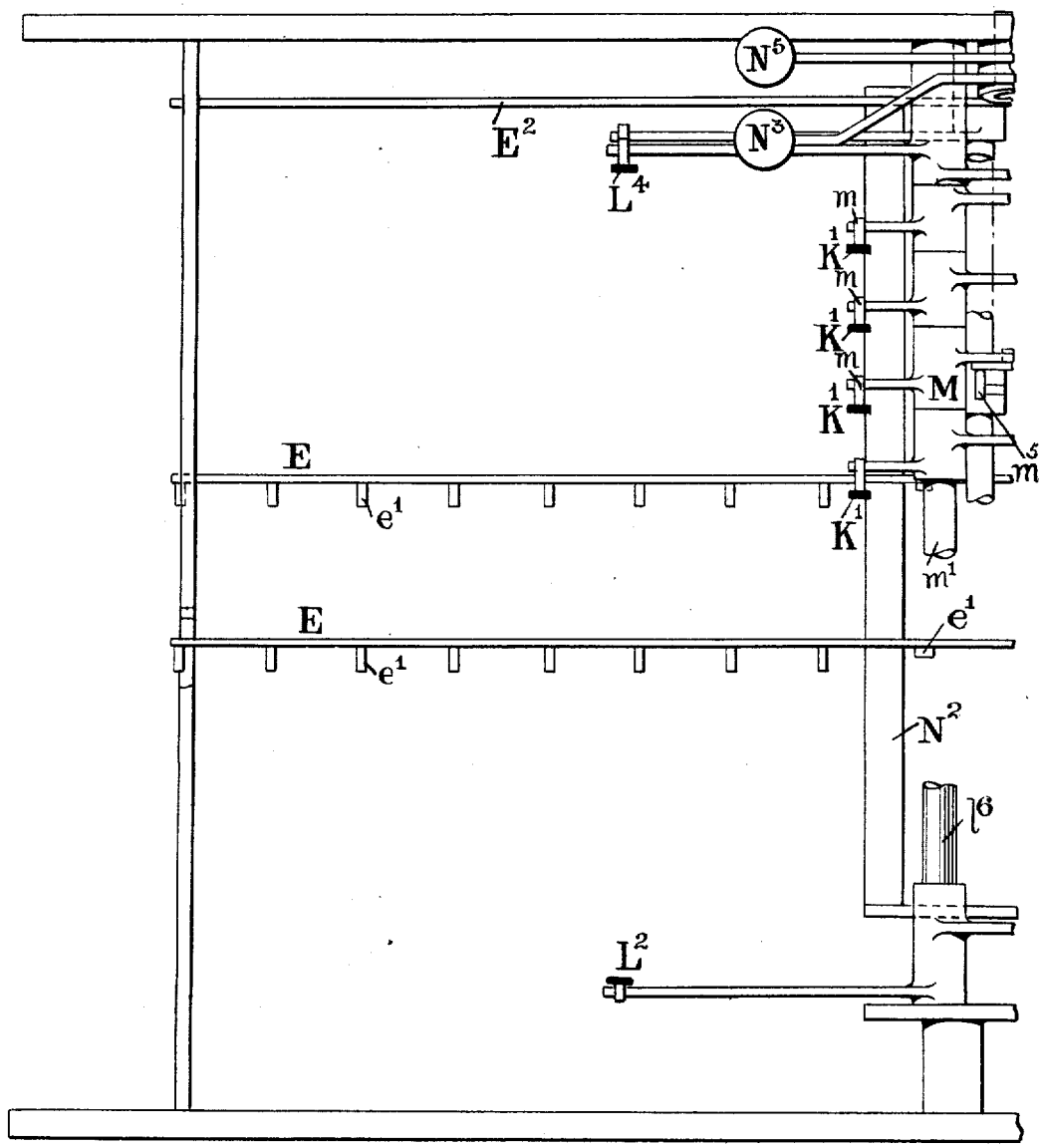
Fig. 5ᵃ

W. H. BROWNING.
APPARATUS FOR ADDING OR CALCULATING.
APPLICATION FILED NOV. 29, 1909.

1,010,227.

Patented Nov. 28, 1911.
13 SHEETS—SHEET 7.

W. H. BROWNING.
APPARATUS FOR ADDING OR CALCULATING.
APPLICATION FILED NOV. 29, 1909.
1,010,227.
Patented Nov. 28, 1911.
13 SHEETS—SHEET 8.
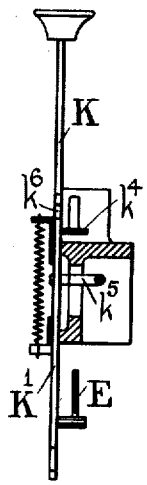
Fig. 15.
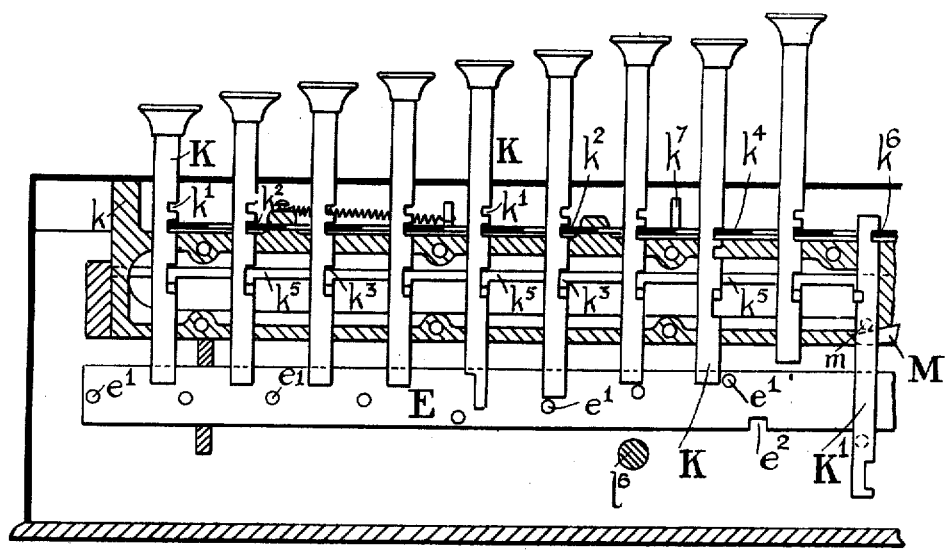
Fig. 6.ᵃ
WITNESSES.
INVENTOR
Walter H. Browning
By
James L. Norris
Atty

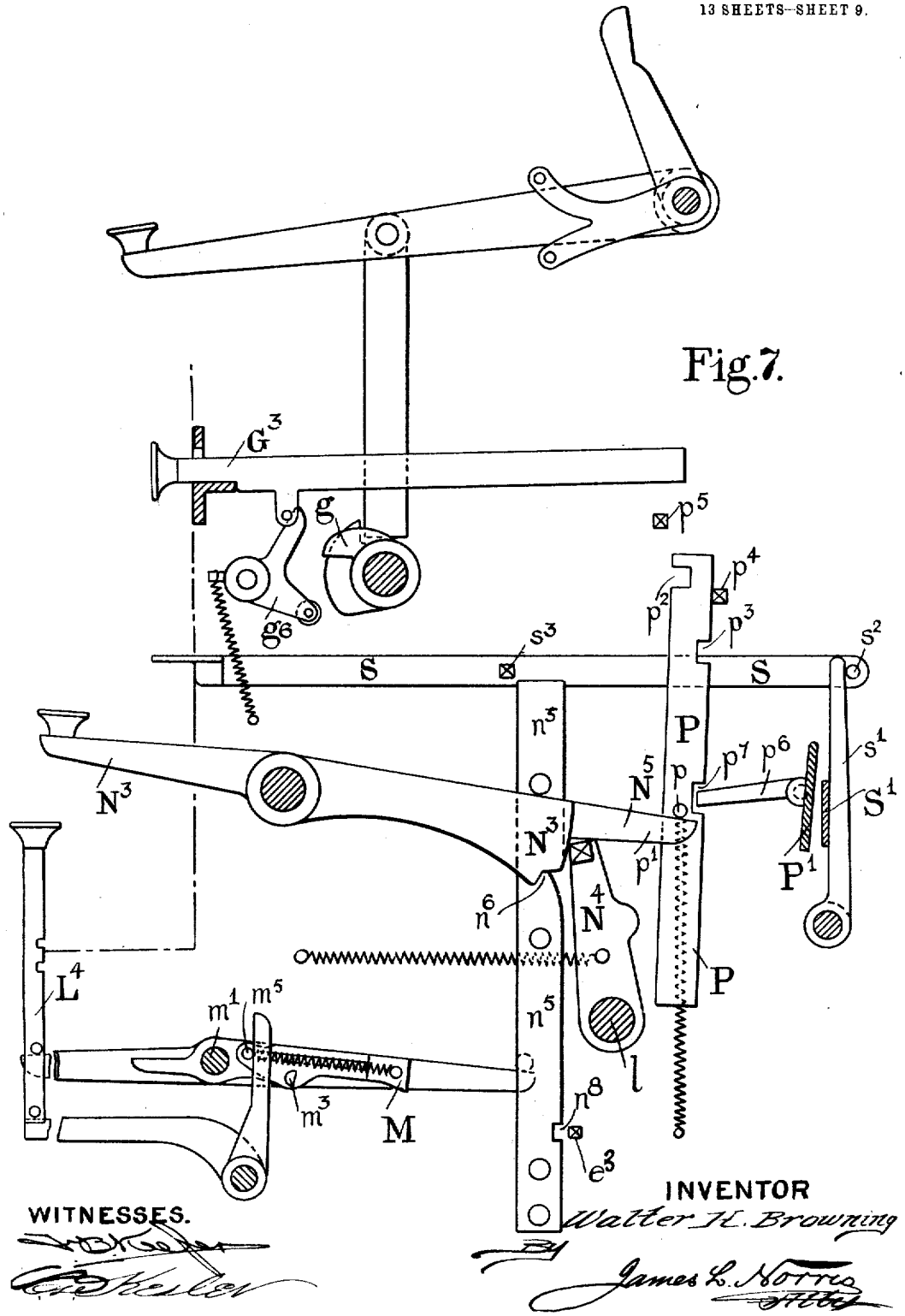

W. H. BROWNING.
APPARATUS FOR ADDING OR CALCULATING.
APPLICATION FILED NOV. 29, 1909.

1,010,227.

Patented Nov. 28, 1911.
13 SHEETS—SHEET 10.

WITNESSES.

INVENTOR.
Walter H. Browning

W. H. BROWNING.
APPARATUS FOR ADDING OR CALCULATING.
APPLICATION FILED NOV. 29, 1909.

1,010,227. Patented Nov. 28, 1911.
13 SHEETS—SHEET 11.

WITNESSES.

INVENTOR
Walter H. Browning
By James L. Norris
Atty.

W. H. BROWNING.
APPARATUS FOR ADDING OR CALCULATING.
APPLICATION FILED NOV. 29, 1909.

1,010,227.

Patented Nov. 28, 1911.
13 SHEETS—SHEET 12.

WITNESSES.

INVENTOR.
Walter H. Browning

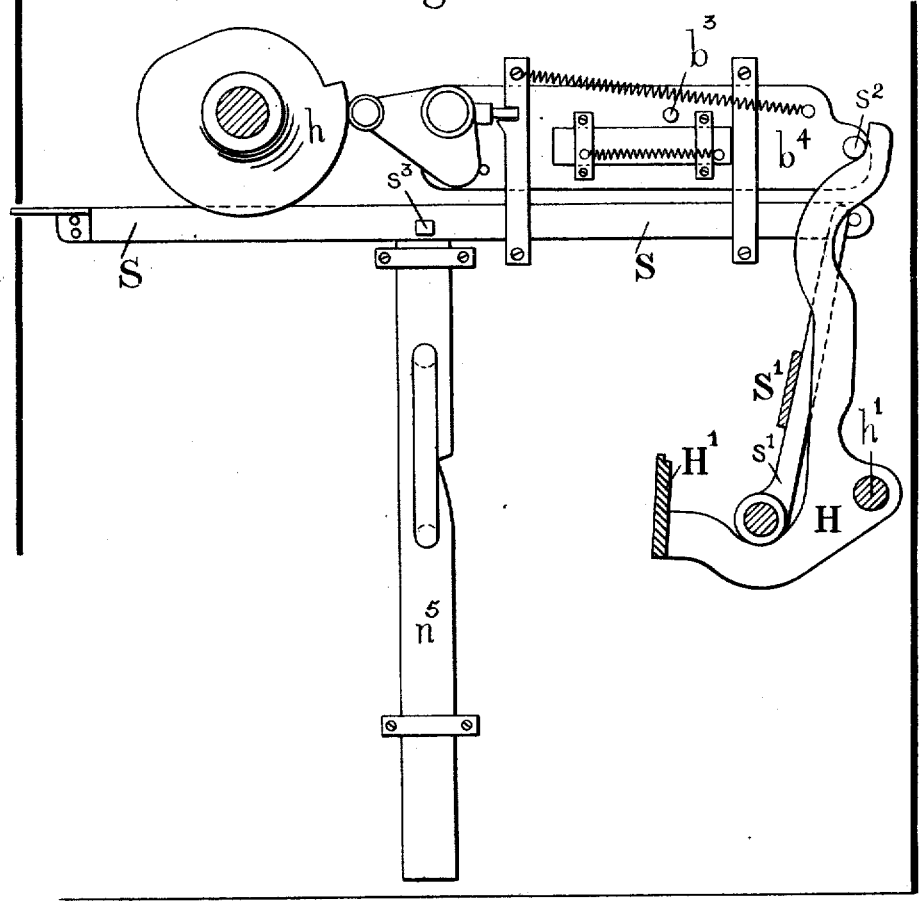

UNITED STATES PATENT OFFICE.

WALTER HENRY BROWNING, OF WEMBLEY, LONDON, ENGLAND, ASSIGNOR TO THE BRITISH ADDING MACHINE COMPANY, LIMITED, OF WESTMINSTER, ENGLAND.

APPARATUS FOR ADDING OR CALCULATING.

1,010,227. Specification of Letters Patent. Patented Nov. 28, 1911.

Application filed November 29, 1909. Serial No. 530,503.

*To all whom it may concern:*

Be it known that I, WALTER HENRY BROWNING, a British subject, residing at Wembley, London, England, have invented certain new and useful Improvements in Apparatus for Adding or Calculating, of which the following is a specification.

This invention relates to that type of adding or calculating machine in which the counting is effected for each denomination by a vertically sliding counting plate and an auxiliary plate which are raised a given distance for each unit by means of keys and levers connected therewith, machines of such type being shown and described in Patents Nos. 975633 and 975634, granted to myself and B. T. O'Brien, November 15, 1910.

The counting plates are as hitherto constructed arranged to represent units, tens, hundreds and thousands and so on, or pence, shillings and pounds, or dollars, francs, marks or other denomination of money or weights and in describing the machine it is only necessary to describe one set of these plates and their operative connections and the connection of one set with the adjacent sets for the purpose of carrying on from one denomination to the next higher denomination.

The object of the present invention is to so construct and arrange the operative parts of the machine that the required movement to perform their several functions is given to them by the forward stroke of the operating-handle the backward stroke only releasing the parts or restoring them to their normal positions.

The invention will be fully described with reference to the accompanying drawings forming part of the specification.

Figure 1:
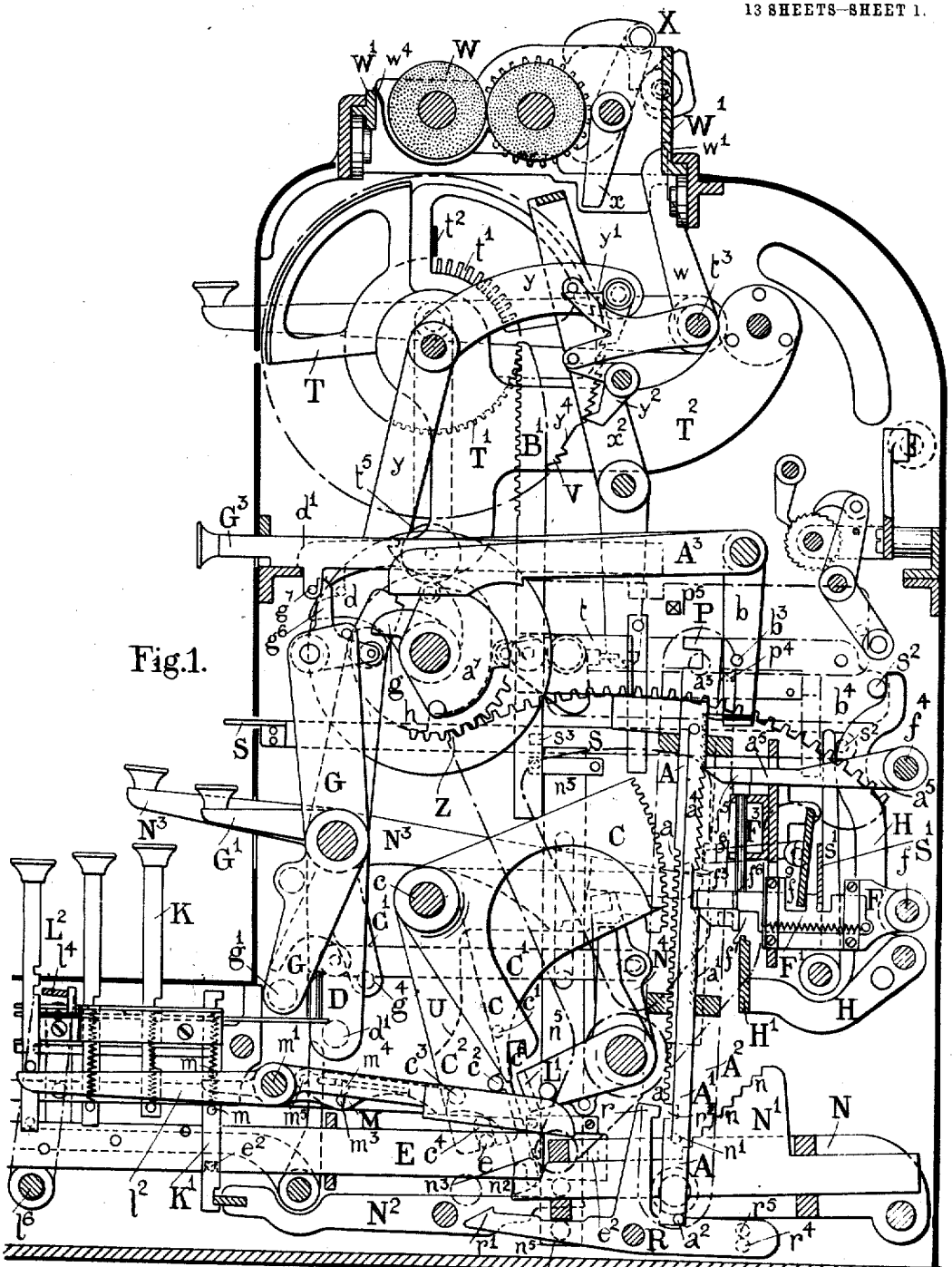
Figure 6:
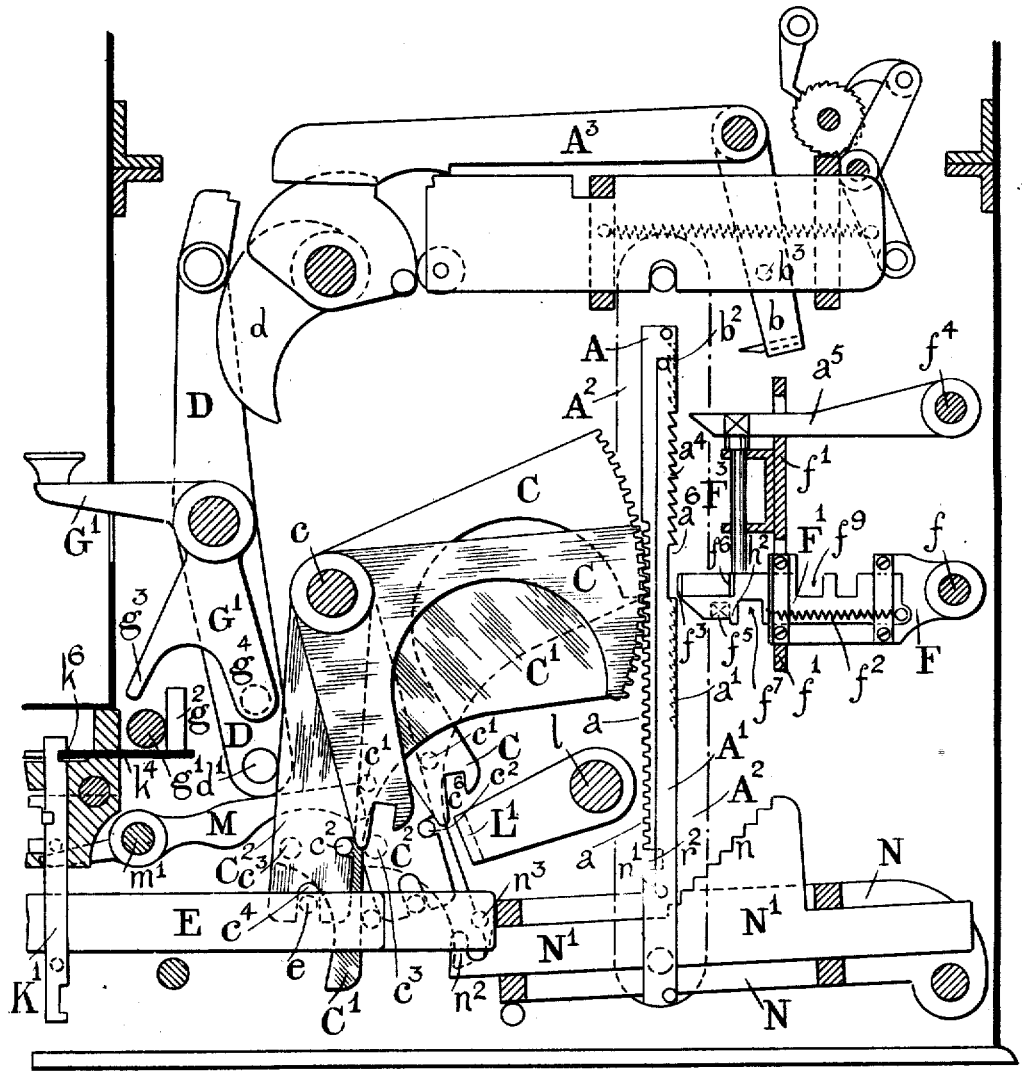
Figure 8:
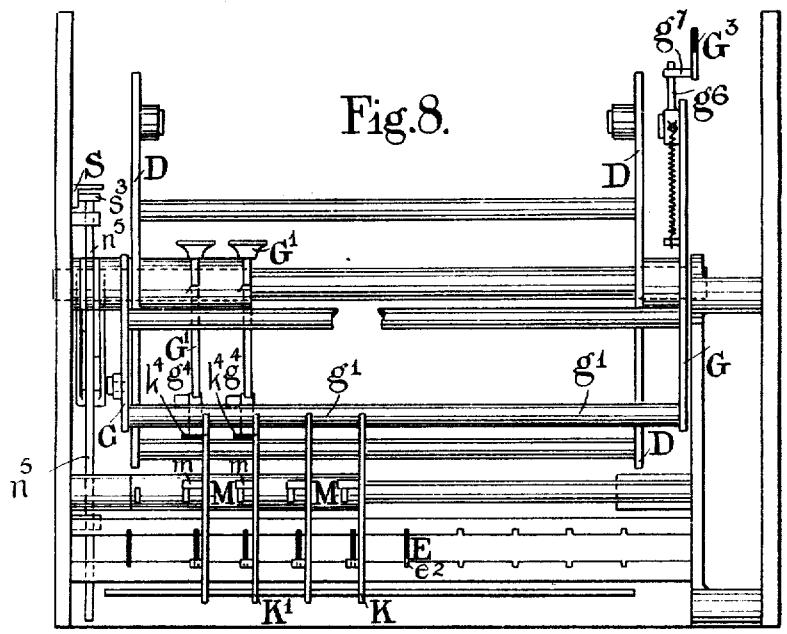
Figure 9:
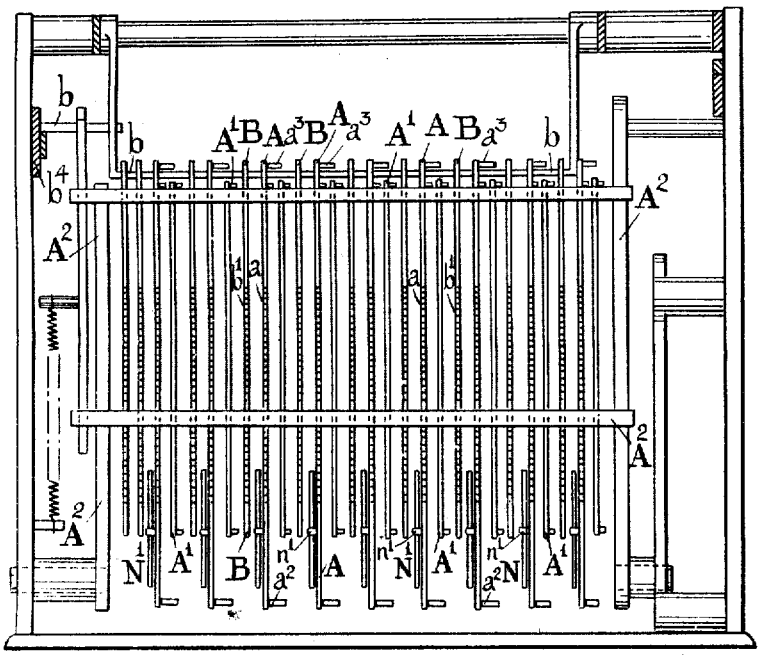
Figure 10:
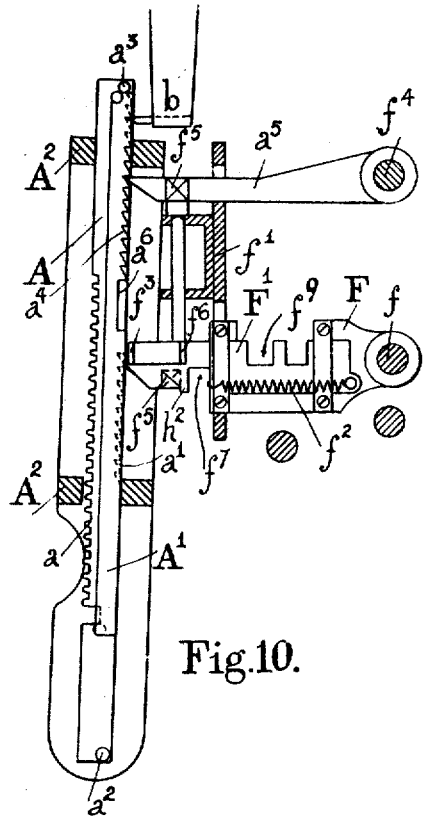
Figure 11:
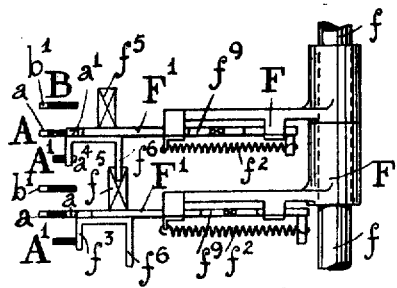
Figure 12:
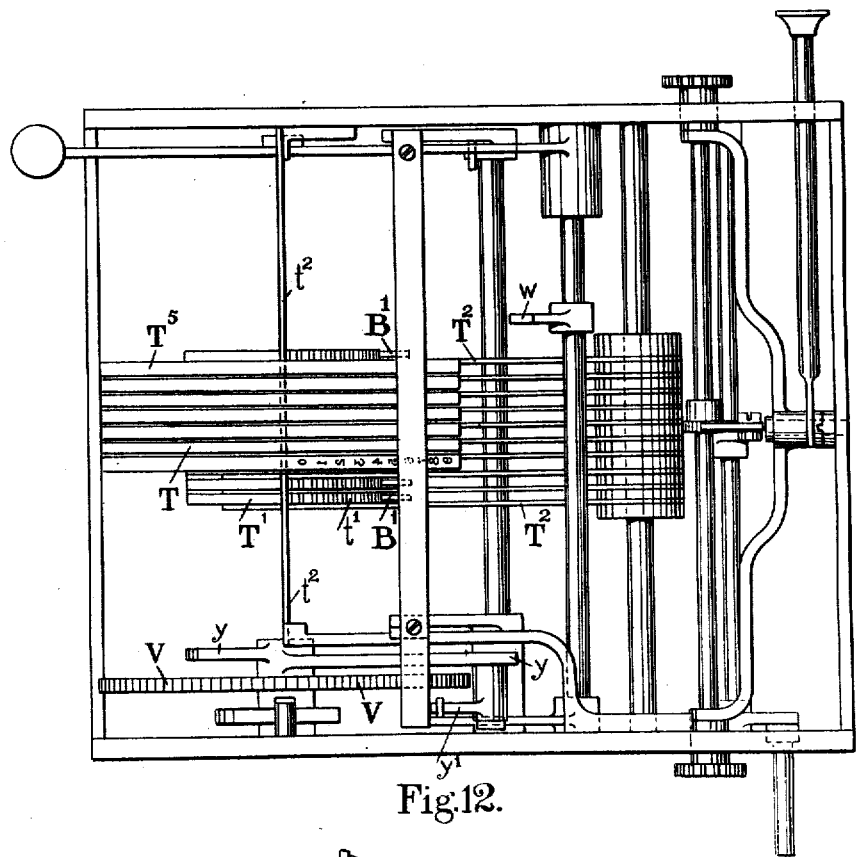
Figure 13:
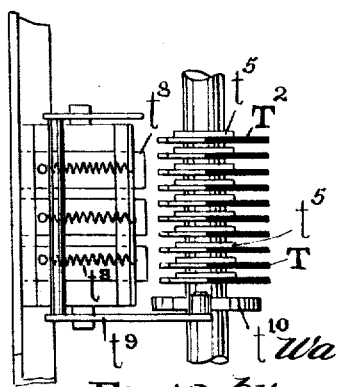

Figures 1 and 1$^a$, side elevation of the machine with the right hand frame removed. Fig. 2, side elevation of cams for working paper feed and indicator wheel (which are hidden or not shown clearly in Fig. 1). Fig. 3, side elevation of locking bolts for type segment levers (which are not shown in Fig. 1). Figs. 4 and 4$^a$, plan with printing mechanism removed. Figs. 5 and 5$^a$, part sectional plan with printing mechanism removed. Figs. 6 and 6$^a$, side elevation with printing mechanism removed, showing one key depressed and adding plates moved into mesh with rack quadrants. Fig. 7, diagrammatic view of keys showing repeat key operated and carriage locking key operated. Fig. 8, front elevation of elevating frame key, resetting frame and correction keys. Fig. 9, front elevation of adding plates frame. Fig. 10, side elevation of (carry on) mechanism showing a carry on. Fig. 11, plan of same. Fig. 12, plan of printing mechanism. Fig. 13, plan of locking bolts for type segment levers (which are not shown in Fig. 12). Fig. 14, detail of carry on cam levers. Fig. 15, transverse section of one set of keys.

The main counting plate A and the auxiliary counting plate A' are mounted in a movable frame A$^2$ capable of moving to and fro as heretofore. The main counting plate is provided with rack teeth $a$ on its front edge and ratchet teeth or notches $a'$ on its back and also with a lateral projection or pin $a^2$ near its lower end and a lateral pin or projection $a^3$ near its upper end both on the same side between which the auxiliary counting plate A' is placed. The pins or projections $a^2$ $a^3$ are adapted to engage the auxiliary counting plate A', the lower one $a^2$ to raise it and the upper one $a^3$ to rest upon the top of the auxiliary plate and maintain the main plate in a position corresponding to that to which the auxiliary counting plate A' may have been raised above its zero position. The auxiliary counting plate A' is made with a plain edge at the front and provided with notches or ratchet teeth $a^4$ on its back edge, which engage with the retaining pawl or catch $a^5$ by which it is maintained in its raised position to receive the main counting plate A when it falls.

Adjacent to each set of counting plates in the swinging or sliding frame A$^2$ a type setting plate B is mounted provided with rack teeth $b'$ on the front edge and with ratchet teeth or notches $b^2$ on the back edge the former by which it is raised and the latter by which it is retained in its raised position by a pawl or retaining lever $b$. The type setting plate B is raised simultaneously with the main counting plate A and a corresponding distance. To the upper end of each type setting plate a cranked arm or lever $b^3$ is affixed by which it is connected with and raises a rack B' hereinafter described with reference to the printing mechanism.

In front of the swinging frame $A^2$ (for each set of counting plates A and A') two toothed quadrant levers C C' are mounted loosely on a transverse shaft $c$. When the swinging or sliding frame $A^2$ and plates A and B are moved forward the counting quadrant C meshes with the rack $a$ on the front edge of the main counting plate A and the type quadrant C' with the rack $b'$ on the front edge of the type setting plate B. The plates A and B are raised by these quadrants the desired distance corresponding with the value of the key struck. Adjacent to the two quadrant levers C C' preferably placed between them a connecting lever $C^2$ is also loosely mounted on the shaft $c$. The counting quadrant is provided with a pin or projection $c'$ projecting toward the connecting lever $C^2$ and the printing quadrant with a similar pin or projection $c^2$ with which the edge of the lever can engage and the printing quadrant is also provided with a pin or projection $c^3$ on its other side. The quadrants C and C' and the connecting lever $C^2$ rock or oscillate on the shaft $c$ of their own gravity in a downward direction to bring them to their operative position and are rocked or oscillated upward by an elevating lever D carrying a transverse rod or bar $d'$ which engages all the connecting levers $C^2$ across the machine, and is operated by a cam $d$ on the cam shaft.

Below each set of quadrant levers C and C' a controlling bar E is mounted capable of sliding to and fro longitudinally of the machine. The function of this bar is to control the extent of the downward movement of the quadrant levers C and C' according to the item to be added at each operation of the keys. The controlling bar E is provided with a lateral projection or pin $e$ near to its rear end which engages in a notch $c^4$ in the lower end of the connecting lever $C^2$ and as the quadrant levers C C' and connecting lever $c^2$ rock or oscillate downward the bar E is caused to move toward the key board or front of the machine and as they are rocked or oscillated upward the bar E is moved back toward the back of the machine into and reset in normal position. Toward the front end of the controlling bar E it is fitted with a number of lateral projections or stops $e'$ one for each key, which engage the lower ends of the keys K when the latter are depressed. The stops $e'$ are set at successively increasing distances from the end of the keys respectively with which they engage such distances corresponding with the value of the several keys so that the distances the controlling bar is permitted to move are equivalent to the value of the key depressed. The effect of this is that the quadrants C and C' are permitted to rock or oscillate downward an equivalent distance and consequently the upward movement to lift the plates will be more or less as the movement downward has been greater or less.

The keys K are mounted to slide vertically in a suitable frame $k$ above the control bar E capable of being depressed a limited distance and returned by a spring, and each is provided with two notches $k'$ $k^2$ with which a sliding locking bar $k^4$ engages and a notch $k^3$ with which a rocking bar $k^5$ engages. The rocking bar $k^5$ is pivoted at the side of the keys and at its end is connected with a notched releasing key K' which slides vertically parallel with the keys K. The notched releasing key K' when in its raised or normal position holds the locking bar $k^4$ out of engagement with the notches $k'$ $k^2$ of the keys K (see Fig. 1), but when depressed the locking bar $k^4$ is permitted to slide forward by entering the notch $k^6$ therein and at the same time enters the notches in the other keys to lock them in their position, (see Fig. 6). On any key being depressed the rocking bar $k^5$ is rocked downward and the releasing key K' simultaneously moved by it until the notch $k^6$ therein coincides with the edge of the locking bar $k^4$ which enters it spring forward and at the same time engaging the notches of all the keys thereby locking them all but the depressed or operated key in their normal position to prevent a second one being depressed also locking the depressed key in that position. The locking bar $k^4$ is withdrawn again from engagement with the keys by a resetting lever G operated by a cam $g$ on the cam shaft and a cross bar $g'$ which engages a pin $g^2$ on the locking bar. A correction lever G' is also placed behind the keys K with an arm $g^3$ which also engages the pin $g^2$ by which the locking bar $k^4$ can be withdrawn and the keys reset should the wrong key be accidentally struck. The correction lever G' by the second arm $g^4$ engaging the connection lever $C^2$ also restores the quadrant levers C C' and the control bar E to normal position. The control bar E is held in normal position against the weight of the rocking quadrant levers C C' by a lateral projection or pin on the release key K' engaging a notch $e^2$ in the underside thereof. When a key K is depressed the release key K' releases the control bar E which slides forward until the corresponding stop $e'$ strikes against the lower end of the key (see Fig. 6).

Behind the swinging or sliding frame $A^2$ which carries the counting plates A A' a bolt lever F is mounted to swing or rock on a transverse shaft $f$, the front end of the bolt lever resting upon a fixed guide frame $f'$. The bolt lever carries a sliding bolt F' formed with a catch or pawl at its end and capable of being pressed backward against the force of a spring $f^2$ which holds it in normal position. The bolt lever F is so placed in relation to the main counting plate A that when the swinging frame A² is moved back and the plate A is in normal position the first ratchet tooth $a'$ engages with the end of the bolt and when the plate is raised one of the other ratchet teeth engages the inclined end of the bolt F' and the plate A is thereby maintained in its raised position until the bolt is withdrawn.

The bolt F' is provided with a lateral projection or pin $f^3$ which enters a notch $a^6$ in the back of the auxiliary adding plate when the latter is in normal position.

Above the bolt lever a pawl or catch $a^5$ resting on the fixed frame $f'$ is pivoted on a transverse shaft $f^4$ and projects forward to engage the ratchet teeth $a^4$ on the rear edge of the auxiliary counting plate A' when the frame swings back. When the auxiliary counting plate is in normal position the pawl $a^5$ engages the first tooth and when raised engages one of the other teeth $a^4$ maintaining the plate in its raised position, see Figs. 1, 6 and 10.

When the auxiliary counting plate A' is in its raised position the back edge engages the projection $f^3$ on the bolt F' and presses the inclined end out of engagement with the ratchet teeth $a'$ of the main counting plate A thereby permitting the latter to fall until the top projection $a^3$ thereon rests upon the head of the auxiliary plate A', and in this position the main plate A again meshes with the teeth of the counting quadrant C as the frame swings forward, the auxiliary plate A' being released and allowed to drop back to normal position.

Lateral projections $f^5$ $f^6$ extend from the sides of the bolt F' and these are so placed and arranged that when the bolt F' is in certain positions the projection $f^5$ on the side of one bolt extends below the projection $f^6$ on the side of the adjacent bolt of the next higher denomination consequently if the first bolt lever F be raised or rocked about its fulcrum or pivot the adjacent one is raised a corresponding distance, see Figs. 10 and 11.

Below the bolt levers F a couple of "carry on" levers H are pivoted on a transverse shaft $h'$ preferably one at each side of the machine which support a "carry on" bar H' (see Figs. 1, 3 and 9). The carry-on bar H' is placed transversely under the forward ends of the bolt levers and bolts F F' and is rocked at each rotation of the cam shaft by a cam $h$ thereon a distance equal to one tooth on one unit of the counting plates A. When the bolts F' are in normal position Figs. 1 and 6, a space or a notch $f^7$ in the underside over-rides the carry-on bar H' so that the bolts are not affected by the movement of the latter. When the bolt F' is pressed back as above described by the auxiliary counting plate A' out of contact with the main counting plate A, a carry-on projection $h^2$ on the underside of the bolt F' is brought into position over the carry-on bar H' so that as the bar is rocked the bolt F' is raised to lift the main counting plate A of the next higher denomination one tooth which is added to the amount already recorded by that plate. This is effected by the lateral projection $f^3$ of the one bolt being also brought under the lateral projection $f^6$ of the adjacent bolt.

In addition to the projection $f^5$ on one bolt to engage the projection $f^6$ on the adjacent bolt a vertically sliding pin F³ is placed in the guide frame $f'$ between each bolt F' and the retaining pawl $a^5$ of the auxiliary counting plate A' of the next higher denomination which pin is also raised by the bolt. Should therefore one or more denominations be engaged in a carry-on at one time and two or more of the bolts F' be withdrawn so that the lateral projection $f^5$ does not engage with the projection $f^6$ of the bolt of next higher denomination the auxiliary counting plate pawl $a^5$ by the pin P³ is raised one tooth and with it the auxiliary plate thereby transmitting a carry-on to the main counting plate A of the next higher denomination.

An eliminating bar L is placed to run transversely of the machine under the ends of the lower members of the counting plate quadrants C to engage when lifted with a notch $c^6$ therein and prevent their falling when a key is struck, and the control bar E moves forward. The eliminating bar L is carried between two levers L' one at either side of the machine pivoted on the transverse shaft $l$. The eliminating bar L and lever L' are brought into action by an eliminating key L² and connecting link or lever $l^2$ placed adjacent to the other keys. The function of the eliminating key L² and bar L' is to disconnect the keys K from the counting plates A to render them non-additive while the type plate quadrant C' and type setting plates B may continue to be operated from the keys to print off a total or to permit of the type setting plates being set up by the totaling mechanism to print off the total. A single eliminating bar L may be employed to traverse the whole machine or in a large machine two or more eliminating bars L L³ with levers and keys L² L⁴ (see plan Fig. 5) may be employed.

The depression of the partial eliminating key L⁴ raises the eliminating bar L³ Fig. 5, and engages the adding quadrants of the higher denominations of numerals only (disconnecting them from the keys K and the control lever E) thereby rendering them non-additive or non-operative when the keys are struck. This leaves the printing quadrants only operative in connection with the keys K so that they may be employed for numbering purposes such as printing index or other numbers in a column against the amounts which are recorded by the other parts of the machine.

A total or single eliminating key $L^2$ is placed preferably at the right hand of the key board and where a partial eliminating key $L^4$ is employed it is placed at the left hand of the key board. The eliminating keys $L^2$ $L^4$ are each locked by a sliding bar $l^3$ entering a notch in a manner similar to that described with reference to the keys K. In addition each eliminating key $L^2$ $L^4$ is locked to prevent depression after the depression of any of the other keys to prevent the eliminating key being brought into action except when the other parts are in normal position. This is effected by a transverse bar $l^4$ which enters a notch in the key and is carried forward by the movement of the key locking bar $k^4$ and a pin $k^7$ thereon engaging the transverse bar $l^4$. The transverse locking bar $l^4$ is carried on two rocking arms or levers $l^5$ mounted on the rocking shaft $l^6$.

Behind the notched releasing key K' and between it and the type plate quadrant C' a cipher control lever M is pivoted. The front end of the lever projects beneath a pin $m$ on one side of the releasing key K' and the rear end engages a pin $c^3$ projecting from the side of the printing plate quadrant $c'$. The levers M are mounted loosely on a transverse shaft $m'$ on which they are free to swing or rock. Lateral fingers $m^3$ $m^4$ project from either side of the cipher control lever M the finger $m^3$ on one side being set lower than the finger $m^4$ on the other side. One lever M is provided for each denomination or bank of keys and the finger $m^3$ on one lever projects beneath the finger $m^4$ of the adjacent lever of lower denomination. The falling of the release key K' on any key being struck, raises the rear end of the cipher control lever M out of contact with the pin $c^3$ on the printing plate quadrant C' permitting it to fall one tooth sufficient to set up the type setting bar one tooth to print 0. The movement of any one cipher control lever also by the finger $m^3$ raises that of next lower denomination and so on all along the range of denominations so that all the type setting plates B of lower denomination than the key struck are raised sufficient distance to print 0 when required, but those of higher denomination are not moved.

In connection with the use of a second or partial eliminating bar $L^3$ and key $L^4$ for the higher denominations a connection is made between the cipher control lever M corresponding thereto which is provided with a sliding arm or finger $m^5$. This arm or finger $m^5$ is moved on the depression of the partial eliminating key $L^4$ and drawn out of the path of the finger $m^4$ of the next lower denomination to prevent the movement of the type setting plates B, and the printing of 0 or ciphers. Consequently when the numerals of higher denomination are eliminated and rendered non-additive although they can be used for numbering and printing they are also disconnected from the cipher control and printing mechanism of the lower denominations.

Below the swinging or sliding frame $A^2$ which carries the counting and type setting plates A and B a vertically swinging total plate frame N is pivoted. This frame for each denomination carries a stepped plate N' with steps $n$ (1 to 8 or 10) which is capable of sliding to and fro therein to bring one of the steps against a projection or pin $n'$ on the main counting plate A corresponding to the height the counting plate may be at. The stepped plate N' is also provided with a hook or catch or notch $n^2$ at the end to engage a pin or projection $n^3$ on the control bar E to connect the two together. In front of the total plate frame N a total unlocking lever $N^2$ is pivoted one end engaging a notch in the release key K'. When the frame N is raised the lever $N^2$ draws down the release key K' out of engagement with the control bar E and releases the latter. The total plate frame N and the total unlocking lever $N^2$ are connected by a link $n^5$ with a key or key lever $N^3$ the depression of which raises the total plate frame N and total plate N' into engagement with the control bar E. The control bar E then moves forward drawing the stepped plate with it until the latter stops against counting plate.

A lever $N^4$ pivoted upon the eliminating lever shaft $l$ (or other shaft) falls under or into a notch $n^6$ in the total key $N^3$ when it is operated and locks it in that position until released by the resetting lever G.

Two total keys $N^3$ and $N^5$ are preferably applied either of which will perform the functions already described, the second of these $N^5$—the grand total key—also acts as a discharge to return the counting plates A A' and connecting mechanism to zero. For this purpose a vertically moving discharge plate P is mounted in the swinging or sliding frame $A^2$ with a lateral projection or pin $p$ with which the end $p'$ of the grand total key $N^5$ engages. At the upper end the plate is provided with a notch $p^2$ on the front edge and a notch $p^3$ on the back edge so that when raised a pin $p^4$ mounted on a slide is drawn into the back notch $p^3$ and as the swinging frame $A^2$ moves forward the front notch $p^2$ engages a fixed pin $p^5$ and retains the plate P in elevated position during the movement of the frame $A^2$. A swinging discharge bar P' placed transversely is pivoted behind the discharge plate and connected therewith by a pawl and lever $p^6$ which when the discharge plate P is in normal position enters a notch $p^7$ therein and when the discharge plate P is raised lies in the path of the edge of the plate. The swinging discharge bar P' extends across all the bolt levers F' engaging a notch or projection $f^9$ thereon. The operation of the grand total lever $N^5$ raises the discharge plate P and the sliding pin $p^4$ enters the notch $p^3$ in the back edge. When the frame $A^2$ next moves forward the notch $p^2$ in the front edge of the plate P passes over the fixed pin $p^5$ which retains the plate P in its raised position and as the frame A next moves back the discharge lever $p^6$ in its path is pushed back and the swinging discharge bar P' is carried back with it and all the retaining bolts F' are moved back releasing the counting plates A A' and permitting them all to return to zero.

A total cipher control lever R of bell crank shape is pivoted below the total plate frame N. The arms of the lever R are formed with a hook $r$ at the end of one and a catch $r'$ at the end of the other. The hook or catch $r$ engages a notch $r^2$ formed below the teeth on the front edge of the main counting plate A and the catch $r'$ engages the tail of the type quadrant C'. A tail $r^3$ is provided to the lever R with lateral projection $r^4$ on one side and lateral projection $r^5$ on the other side. The projection $r^4$ extends below the projection $r^5$ of next lower denomination and the projection $r^5$ extends above the projection $r^4$ of the next higher denomination (as already described with reference to the cipher control levers). All the total cipher control levers across the machine are held down and out of action or engagement either with the plates A or quadrant C' by the total plate frame N resting upon them. When the frame N is raised the levers R come into action, the hooked ends $r$ fall into the notches $r^2$ of such of the counting plates as are to the left of the plate of the highest number recorded thereby preventing the setting up of the type plate B and the printing of 0 to the left thereof.

At one side of the machine parallel to the control bars E a sliding locking bar $E^2$ is mounted. This bar carries a square stud $e^3$ and is moved to and fro with the transverse locking bar $l^4$ of the eliminating keys $L^2$ and $L^4$ being connected to the lever $l^5$ by a pin $e^4$. The square stud or pin $e^3$ enters a notch $n^8$ in the link $n^5$ which connects the total keys $N^3$ $N^5$ with the total plate frame N. When thus locked the total keys $N^3$ $N^5$ are prevented being operated should any of the denomination keys K be depressed.

It may be necessary to operate or rotate the handle of the machine several times to make all the changes necessary to obtain the correct total and in order to indicate to the operator when the correct total is arrived at, a moving indicator or locking slide S is provided such that when it is in the rear position the end is inside the case of the machine and locked in that position to prevent the total key $N^3$ or $N^5$ being depressed and when in its forward position the end is projected forward through a slot in the case into sight of the operator to indicate that the total key $N^3$ or $N^5$ is free and may be depressed.

Above the bolt levers F a second transverse rocking bar S' is placed with which the projection $S^2$ engages. The bar S' is mounted on a rocking lever $s'$ which extends upward and engages a pin $s^2$ at the end of the indicator or locking slide bar S consequently when any one of the bolts F' and bolt levers F are moved back, bar S is drawn back with them. On the side of the slide bar S a pin or projection $s^3$ extends laterally so placed that when the slide bar S is drawn back the projection $s^3$ is placed over the end of the connecting link $n^5$ and prevents its upward movement and thereby prevents the manipulation of either of the total keys $N^3$ $N^5$. Should therefore any one of the bolts F' be moved back by a "divide or transfer" taking place the indicator or locking slide bar S will be moved backward and out of sight; should on the other hand the total be complete the indicator or locking slide S would not be moved and the "total key" would be free to be depressed.

On the key resetting lever G a trip lever $g^6$ is pivoted with which the actuating cam $g$ engages, the lever $g^6$ may be moved out of the path of the cam $g$ preventing the resetting of the keys which have been depressed allowing the repeating or re-adding of the number again and again. The trip lever is moved out of the path of the cam $g$ by a repeat key $G^3$ which can be moved to and fro as required a pin $g^7$ thereon engaging the pivoted trip lever $g^8$.

The retaining pawl $b$ for the type lifting plates B is withdrawn by a projection or pin $b^8$ on the slide $b^4$ of the carry-on motion or it may be withdrawn by a key or lever provided for the purpose.

The elevating lever D which returns the quadrant levers to their normal or first position is locked, when oscillated by the elevating cam to its full extent by a lever $d'$ which is raised and lowered by a projection $d^3$ on the cam $d$ and remains so locked until released by the raising of the locking lever on the return stroke of the operating handle.

The swinging or sliding frame $A^2$ which carries the counting plates A A' is locked in its normal or backward position by a locking lever $A^3$ which is raised and lowered by a cam $a^7$ on the cam shaft. This cam comes into operation during the early part of the forward movement of the handle. The mechanism for displaying the numbers and for printing comprises a number of disks or wheels T with either the numerals or the type or both on the periphery. It is preferred to have both on the same periphery so that a numeral can be displayed while the corresponding type is printing.

Each type disk T carrying the type numerals upon its periphery is operated by a rack B' gearing with a pinion T' on the side of the disk or on the disk spindle. An extending arm or finger $t$ affixed to the rack rests upon a bracket $b^3$ attached to the top of the type setting plate B and the rack is moved vertically thereby consequently the movement of the rack B' and of the type disk corresponds with that of the type setting plate B.

In the periphery of each type pinion T' notches $t'$ are cut corresponding in number with the numerals or type and with these notches a blade $t^2$ engages thereby locking the pinion T' and type disk T in correct position during the printing operation and securing alinement of the type. The type disks T are pivoted in a carrier frame or bracket $T^2$ singly or in groups which carrier is also pivoted thereby permitting the disks to be raised independently, singly or in groups, against the printing platen.

The racks B' move freely in guide bearings and the racks may be rounded at top to clear the rim of the type disks T and the type disk carriers $T^2$ are mounted on a transverse shaft $t^3$ and rest on a guide bracket.

The disk carriers $T^2$ are raised by a series of cams $T^3$ on the cam shaft each cam acting on a runner $t^5$ on the foot of the carrier. The cams $T^3$ are arranged to elevate each carrier and disk in succession and are mounted on the cam shaft so that they may be together moved laterally thereon. Between each cam sufficient space is provided to permit of the runner $t^5$ on the carrier passing between. The series of cams are moved laterally on the shaft after the printing has been effected by a bell crank forked lever $T^4$ operated by a shaft cam $t^6$ on the same cam shaft sufficient distance to allow the carrier runner to drop between them and render the cams inoperative on the backward stroke of the handle. The bell crank lever $T^4$ is moved in one direction by a spring against the action of the cam and is locked in position by another cam $t^7$ on the same shaft.

The carriers $T^2$ are locked in normal position, after the printing has been carried out to prevent further movement by a series of locking bolts $t^8$ which are moved in one direction by a spring and in the other direction of a bell crank lever $t^9$ operated at the proper time by another cam $t^{10}$ on the cam shaft.

An additional star printing disk $T^5$ mounted in a similar carrier is placed alongside of the printing disks to print a star when the keys K are disconnected or eliminated and used as non-additive to indicate that the numbers printed in such lines are not included in the totals. This star disk $T^5$ is operated by a type setting plate operated by quadrant lever U which is brought into action when the eliminating key L is depressed, and the bar L engages the counting quadrants C.

On the periphery of each type disk T in addition to the type are inscribed a number of indicating numerals which primarily indicate the numeral corresponding to the value and denomination of the key depressed and indicate across from one to the other the last amount added to the transaction. The same numerals may be employed to indicate the total amount of the sum or transaction.

A printing platen or roller W is mounted in suitable bearings above the type disks T with a paper roll and ink or carbon ribbon and means for moving the paper and ink ribbon, which may be of any ordinary construction such as employed in type writing machines.

A carriage W' is mounted above the printing disks T to carry the platen W and the paper upon which the items are printed. This carriage has a movement across the machine and friction feed pinions, pawls or other mechanism for moving the paper forward. The carriage may be built up of sides connected by stretcher bars with rollers thereon.

The carriage W' moves freely without slack between each set of rollers. A notched locking bar $w'$ is fitted to the carriage into the notches of which a locking lever $w$ enters to lock the carriage in correct position. When the locking lever is removed the carriage will then be free to move across the machine operated by a spring and when a fresh or any notch of the notched locking plate shall present itself the locking lever will be returned by means of its spring. A paper tear off plate, plain or serrated, is placed across the front of the carriage and secured to the forward ends of the brackets and a paper guide $w^4$ is attached to the underside of these brackets. Bearing blocks are fitted to the ends of the platen shaft and drop into the brackets and may be adjusted thereon.

The paper feed motion X on the carriage is similar to that employed on type writers with a spacing device to allow of two or more spaces of lines to be obtained. This feed motion is provided with a depending lever $x$ to engage a transverse rocking bar mounted in the frame of the printing mechanism. This bar is rocked by a cam $x'$ on the cam shaft and a lever $x^2$ pivoted to the frame side and a link $a^3$, a suitable ink ribbon feed is connected thereto and operated thereby.

On one of the side frames is mounted an indicator ratchet wheel V. This indicator ratchet wheel has numerals from 1 to 100 (or as many as are desired) on its periphery and is cut with ratchet teeth, one tooth for each numeral which may be on the wheel.

The indicator wheel V is for the purpose of indicating to the operator of the machine the number of times the handle of the machine shall have been rotated and so enable such operator to print successive columns of figures which shall be of the same length or number of lines.

Mounted alongside the indicating ratchet wheel V is a feed lever $y$ of bell crank or other suitable form. On one arm or member of the feed lever is mounted a feed pawl $y'$ adapted to enter the ratchet teeth of the indicator wheel. The lower arm of the feed lever $y$ extends downward and makes contact with a cam on the main shaft. Each time the main shaft is rotated by the handle of the machine this cam will cause the feed lever and its feed pawl to advance the indicator wheel one tooth and present a fresh numeral to the operator.

A retaining pawl $y^2$ is mounted on the main frame of the machine and serves to retain the indicator wheel after it is moved by the feed lever.

Both the feed pawl and the retaining pawl have extending arms which are adapted to come into contact with suitable pins carried by the release lever or bar. Therefore when this release lever or bar is moved downward these pins will take the feed and retaining pawls out of the teeth of the indicator ratchet wheel and leave same free to return to zero. This return action is effected by a clock or other suitable spring attached to the hub of the indicator wheel and the main frame. Suitable stops are provided to position the indicator wheel at zero.

In order to prevent the indicator ratchet wheel V from being advanced or rotated more than the desired number of numerals or number of ratchet teeth, and so prevent overwinding of the returning spring, a blank piece $y^4$ without teeth is formed on the side of the indicator wheel which prevents it being moved farther by the feed pawl Y, and therefore although the handle of the machine may go on working the indicator wheel will remain stationary until it shall be allowed to return to zero when the release bar is moved.

A roll of paper is carried on the machine so that either column or strip listing may be done.

The cams referred to are placed on a cam shaft near the front of the machine and are operated by a wheel or pinion in gear with a quadrant pinion or rack Z rotated by the handle or hand lever.

What I claim as my invention and desire to protect by Letters Patent is:—

1. In adding or calculating machines the combination with the vertically sliding calculating plates A and A' raised a given distance for each unit, a swinging frame $A^2$ by which the plates are carried, quadrant levers with teeth to engage and lift one of the sliding plates, a longitudinal sliding bar released by the depression of a key, a set of keys for each denomination and an operating handle by which the several parts of the machine are set in motion, of a vertically moving type setting plate B placed in the swinging frame $A^2$ adjacent to the main counting plate A and auxiliary counting plate A' to be raised simultaneously therewith and a type setting rocking quadrant C' and a rocking connecting lever $C^2$ placed between the quadrants C C' by which both quadrants C C' are raised simultaneously.

2. In adding or calculating machines the combination with the vertically sliding calculating plates A and A' raised a given distance for each unit, a swinging frame $A^2$ by which the plates are carried, quadrant levers with teeth to engage and lift one of the sliding plates, a longitudinal sliding bar released by the depression of a key, a set of keys for each denomination and an operating handle by which the several parts of the machine are set in motion, of a vertically moving type setting plate B placed in the swinging frame $A^2$ adjacent to the main counting plate A and auxiliary counting plate A' to be raised simultaneously therewith, and a type setting rocking quadrant C' and a rocking connecting lever $C^2$ placed between the quadrants C C' by which both quadrants C C' are raised simultaneously, and means to prevent the counting plate quadrants falling when it is desired to indicate or record the total of the transactions of the machine substantially as described.

3. In adding or calculating machines the combination with the vertically sliding calculating plates A and A' raised a given distance for each unit, a swinging frame $A^2$ by which the plates are carried, quadrant levers with teeth to engage and lift one of the sliding plates, a longitudinal sliding bar released by the depression of a key, a set of keys for each denomination and an operating handle by which the several parts of the machine are set in motion, of a vertically moving type setting plate B placed in the swinging frame $A^2$ adjacent to the main counting plate A an auxiliary counting plate A' to be raised simultaneously therewith a type setting rocking quadrant C' and a rocking connecting lever $C^2$ placed between the quadrants C C' by which both quadrants C C' are raised simultaneously and an eliminating bar L running longitudinally across the machine to engage the quadrants C C' and prevent them falling when a key is depressed.

4. In adding or calculating machines the combination with the vertically sliding calculating plates A and A' raised a given distance for each unit, a swinging frame $A^2$ by which the plates are carried, quadrant levers with teeth to engage and lift one of the sliding plates, a longitudinal sliding bar released by the depression of a key, a set of keys for each denomination and an operating handle by which the several parts of the machine are set in motion of a vertically moving type setting plate B placed in the swinging frame $A^2$ adjacent to the main counting plate A and auxiliary counting plate A' to be raised simultaneously therewith and a type setting rocking quadrant C' and a rocking connecting lever $C^2$ placed between the quadrants C C' by which both quadrants C C' are raised simultaneously, and a plurality of eliminating bars L $L^3$ levers and keys $L^2$ $L^4$ by which on the depression of the eliminating key $L^4$ the eliminating bar $L^3$ is raised to engage the adding quadrants of the higher denomination only, thereby rendering them non-additive when the keys K are struck.

5. In adding or calculating machines the combination with the vertically sliding calculating plates A A' raised a given distance for each unit, a swinging frame $A^2$ by which the plates are carried, quadrant levers with teeth to engage and lift one of the sliding plates, a longitudinal sliding bar released by the depression of a key, a set of keys for each denomination and an operating handle by which the several parts of the machine are set in motion, of a vertically moving type setting plate B placed in the swinging frame $A^2$ adjacent to the main counting plate A an auxiliary counting plate A' to be raised simultaneously therewith and a type setting rocking quadrant C' and a rocking connecting lever $C^2$ placed between the quadrants C C' by which both quadrants C C' are raised simultaneously and an eliminating bar L running longitudinally across the machine to engage the quadrants C C' and prevent them falling when a key is depressed, and a cipher control lever M by which the printing plate quadrant $C^2$ is allowed to fall one tooth to set up the cipher or zero (0) for printing.

6. In adding or calculating machines the combination with the vertically sliding calculating plates A and A' raised a given distance for each unit, a swinging frame $A^2$ by which the plates are carried, quadrant levers with teeth to engage and lift one of the sliding plates, a longitudinal sliding bar released by the depression of a key, a set of keys for each denomination and an operating handle by which the several parts of the machine are set in motion of a vertically moving type setting plate B placed in the swinging frame $A^2$ adjacent to the main counting plate A and auxiliary counting plate A' to be raised simultaneously therewith and a type setting rocking quadrant $C'$ and a rocking connecting lever $C^2$ placed between the quadrants C C' by which both quadrants C C' are raised simultaneously, and an eliminating bar L moving longitudinally across the machine to engage the quadrants C C' and prevent them falling when a key is depressed, a cipher control lever M by which the printing plate quadrant $C^2$ is allowed to fall one tooth to set up the cipher or zero (0) for printing, and a stepped total plate N carried in a vertically swinging frame W to set up the total recorded by the machine for printing.

7. In adding or calculating machines the combination with the vertically sliding calculating plates A and A' raised a given distance for each unit, a swinging frame $A^2$ by which the plates are carried, quadrant levers with teeth to engage and lift one of the sliding plates, a longitudinal sliding bar released by the depression of a key, a set of keys for each denomination and an operating handle by which the several parts of the machine are set in motion, of a vertically moving type setting plate B placed in the swinging frame $A^2$ adjacent to the main counting plate A and auxiliary counting plate A' to be raised simultaneously therewith a type setting rocking quadrant C' and a rocking connecting lever $C^2$ placed between the quadrants C C' by which both quadrants C C' are raised simultaneously, and an eliminating bar L running longitudinally across the machine to engage the quadrants C C' and prevent them falling when a key is depressed, a cipher control lever M by which the printing plate quadrant $C^2$ is allowed to fall one tooth to set up the cipher or zero (0) for printing, and a total cipher control lever R which engages with the main counting plate and with the tail of the quadrant C'.

8. In adding or calculating machines the combination with the vertically sliding calculating plates A and A' raised a given distance for each unit, a swinging frame $A^2$ by which the plates are carried, quadrant levers with teeth to engage and lift one of the sliding plates, a longitudinal sliding bar released by the depression of a key, a set of keys for each denomination and an operating handle by which the several parts of the machine are set in motion, of a vertically moving type setting plate B placed in the swinging frame $A^2$ adjacent to the main counting plate A and auxiliary counting plate A' to be raised simultaneously therewith, and a type setting rocking quadrant C' and a rocking connecting lever C² placed between the quadrants C C' by which both quadrants C C' are raised simultaneously, and an eliminating bar L moving longitudinally across the machine to engage the quadrants C C' and prevent them falling when a key is depressed, a cipher control lever M by which the printing plate quadrant C² is allowed to fall one tooth to set up the cipher or zero (0) for printing, a total cipher control lever R which engages with the main counting plate and with the tail of the quadrant C' and a plurality of type disks each mounted in a swinging frame to permit of the disks being independently raised against a printing platen and a series of cams mounted upon a cam shaft one in advance of the others to elevate each carrier and disk in succession to effect the printing separately.

9. In adding or calculating machines the combination with the vertically sliding calculating plates A and A' raised a given distance for each unit, a swinging frame A² by which the plates are carried, quadrant levers with teeth to engage and lift one of the sliding plates, a longitudinal sliding bar released by the depression of a key, a set of keys for each denomination and an operating handle by which the several parts of the machine are set in motion, of a vertically moving type setting plate B placed in the swinging frame A² adjacent to the main counting plate A and auxiliary counting plate A' to be raised simultaneously therewith, a type setting rocking quadrant C' and a rocking connecting lever C² placed between the quadrants C C' by which both quadrants C C' are raised simultaneously, an eliminating bar L moving longitudinally across the machine to engage the quadrants C C' and prevent them falling when a key is depressed, a cipher control lever M by which the printing plate quadrant C² is allowed to fall one tooth to set up the cipher or zero (0) for printing, and a total cipher control lever R which engages with the main counting plate and with the tail of the quadrant C', and transfer mechanism comprising a rocking bolt F and sliding bolt F' the latter characterized by a pawl at one end to engage the ratchet teeth or notches on the back edge of the main counting plate A, and a lateral projection $f^3$ to bear against the back edge of the auxiliary counting plate A', lateral projections $f^5$ $f^6$ on the sliding bolts F' the projection on one bolt passing beneath and engaging with the projection on the adjacent bolt, a vertically sliding pin F³ and a retaining pawl $a^5$ and the "carry on" or transfer levers H and the "carry on" or transfer bar H'.

In testimony whereof I have hereunto set my hand in presence of two subscribing witnesses.

WALTER HENRY BROWNING.

Witnesses:
 HAROLD VINK,
 H. V. JEFFCOAT.

Copies of this patent may be obtained for five cents each, by addressing the "Commissioner of Patents, Washington, D. C."